United States Patent
Wakamatsu

(10) Patent No.: US 9,692,962 B2
(45) Date of Patent: Jun. 27, 2017

(54) CONTROL DEVICE, OPTICAL APPARATUS, IMAGING APPARATUS, AND CONTROL METHOD

(71) Applicant: CANON KABUSHIKI KAISHA, Tokyo (JP)

(72) Inventor: Nobushige Wakamatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/099,810

(22) Filed: Apr. 15, 2016

(65) Prior Publication Data
US 2016/0316137 A1    Oct. 27, 2016

(30) Foreign Application Priority Data
Apr. 21, 2015  (JP) .................. 2015-086886

(51) Int. Cl.
H04N 5/232    (2006.01)
(52) U.S. Cl.
CPC ..... H04N 5/23219 (2013.01); H04N 5/23258 (2013.01); H04N 5/23264 (2013.01); H04N 5/23287 (2013.01); H04N 5/23293 (2013.01)
(58) Field of Classification Search
CPC ....... H04N 5/23219; H04N 5/23248–5/23264; H04N 5/2328; H04N 5/23283; H04N 5/23287; G02B 27/64; G02B 27/646; G02B 27/648; G02B 2205/00–2205/0038; G03B 5/00; G03B 5/02
See application file for complete search history.

(56) References Cited

U.S. PATENT DOCUMENTS

2015/0222809 A1*  8/2015  Osuka ............... H04N 5/23212
                                                          348/239
2016/0173765 A1*  6/2016  Shimizu ............ H04N 5/2353
                                                          348/222.1

FOREIGN PATENT DOCUMENTS

JP    07-226873 A    8/1995
JP    2010-093362 A   4/2010

* cited by examiner

Primary Examiner — Paul Berardesca
(74) Attorney, Agent, or Firm — Cowan, Liebowitz & Latman, P.C.

(57) ABSTRACT

A control device configured to track a subject by controlling a correcting lens so that the subject is moved to a target position of a photographed image. The control device performs feedback control so that a difference between a position of the subject and a target position of the subject in the photographed image becomes small. The control device detects a photographing condition and changes a degree of tracking of the subject by changing a control gain in the feedback control based on the detected photographing condition.

11 Claims, 7 Drawing Sheets

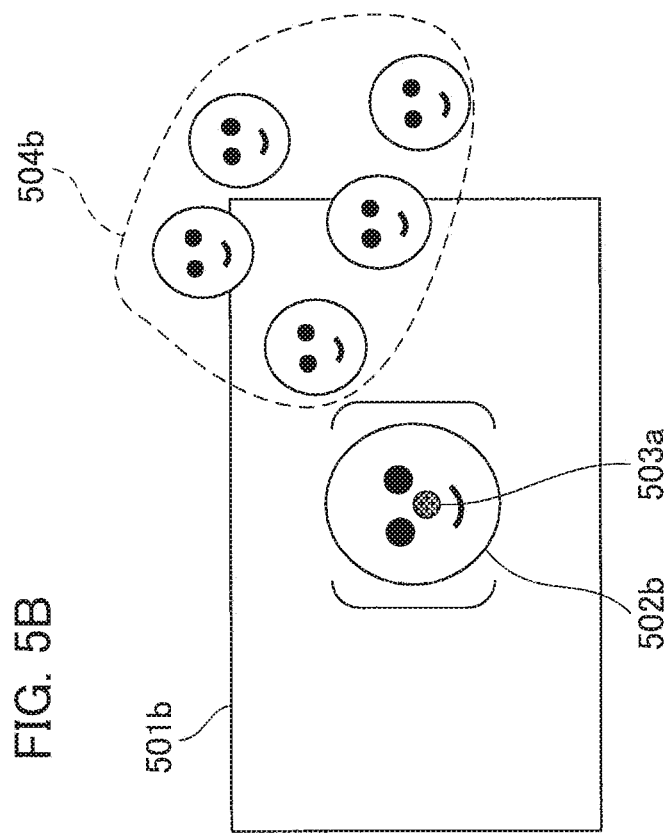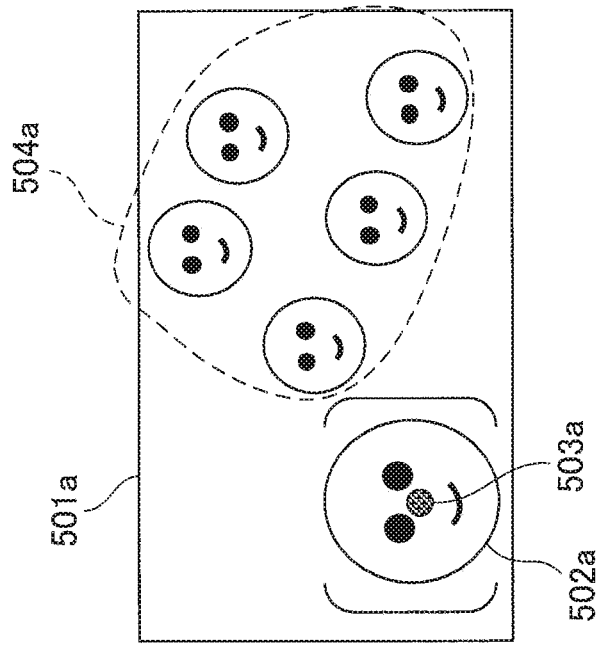

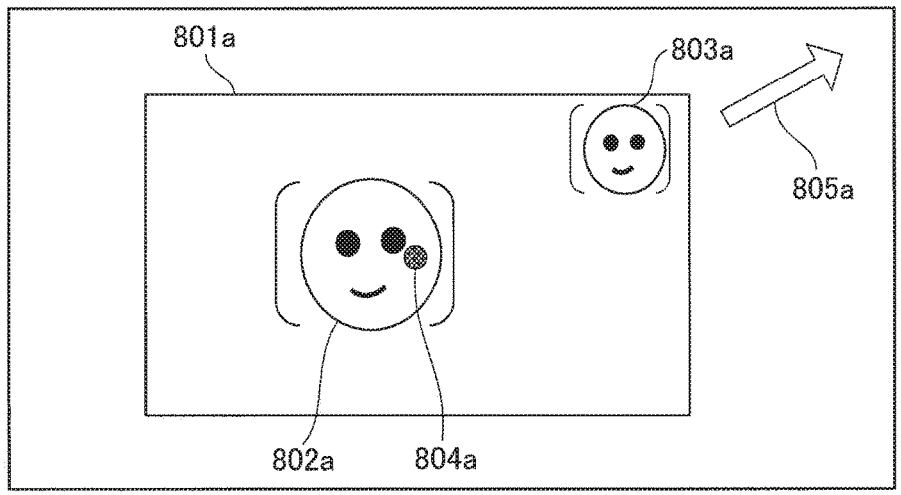
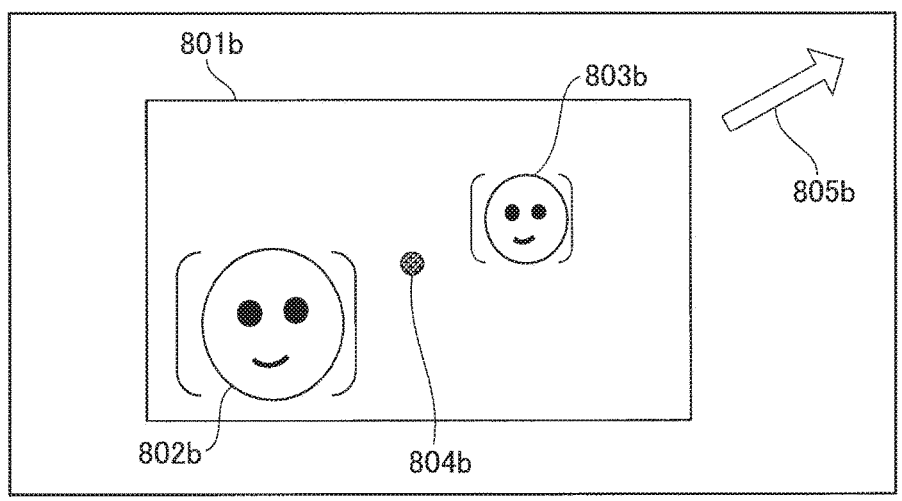
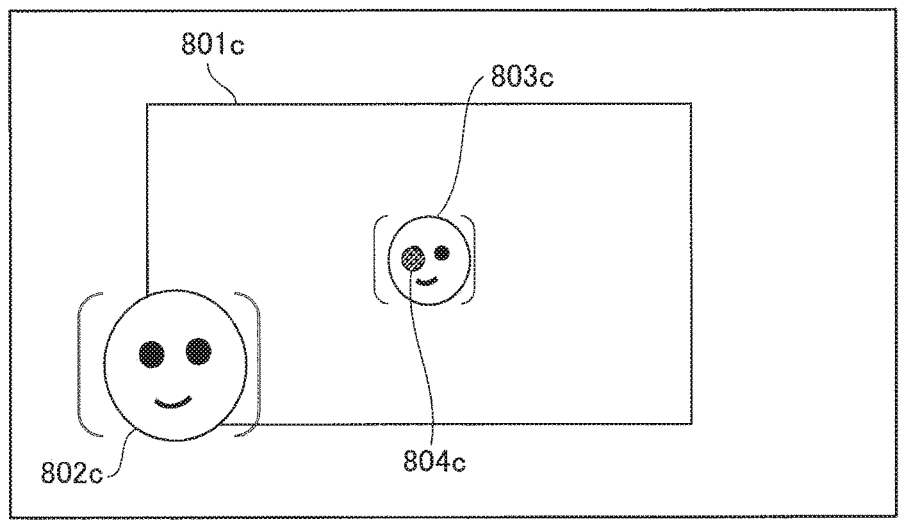

CONTROL DEVICE, OPTICAL APPARATUS, IMAGING APPARATUS, AND CONTROL METHOD

BACKGROUND OF THE INVENTION

Field of the Invention

The present invention relates to a control device, an optical apparatus, an imaging apparatus, and a control method.

Description of the Related Art

In imaging apparatuses such as digital cameras, important imaging jobs such as exposure decisions or focus manipulations are fully automated. In imaging apparatuses on which anti-vibration control devices preventing image blur caused due to camera shake or the like are mounted, factors causing photographing mistake of photographers are mostly resolved. Imaging apparatuses that have a face detection function or a human body detection function of detecting the faces or bodies of people included in subjects have been proposed. In such imaging apparatuses, for example, patterns by which the faces of people are determined are decided in advance, and thus portions matching the patterns included in images can be detected as the faces of people. The detected faces of people are referred to, for example, for focus control or exposure control.

However, photographing in a state such that subjects are moving or photographing in telephoto states such that a focal distance becomes large causes following problems. When a subject is moving and deviates from a photographed image, it is necessary for photographers to perform special techniques in order to track the continuously moving subject by performing manipulations with high precision. When photographing is performed with cameras including telephoto lenses in which focal distance grow larger, influences of image blur caused due to camera shake increase. Therefore, it is difficult to maintain main subjects at the centers of the photographed images. Even when the photographer manipulates the camera to get the subject back inside the photographed image, camera shake amounts manipulated with intention by the photographer are also subjected to blurring correction. Therefore, it is difficult to minutely adjust the subject inside the photographed image or at the center of the photographed image due to the influences of anti-vibration control.

Japanese Patent Laid-Open No. 2010-93362 discloses an imaging apparatus that automatically tracks a subject by moving a part of an optical system in a direction intersecting an optical axis. Japanese Patent Laid-Open No. H7-226873 discloses an imaging apparatus that extracts a target subject from a photographing signal to output the central position of the subject and tracks a subject using a rotary camera platform or the like so that the central position of the subject is output in the vicinity of the center of a photographed image.

When subject tracking is performed so that the central position of a subject is maintained at a specific position of a photographed image as in the imaging apparatus disclosed in Japanese Patent Laid-Open No. H7-226873, there is the following problem. When a plurality of subjects such as faces or peoples are present inside a photographed image, the imaging device selects only one specific subject and performs control such that the central position of the subject is maintained at the center of a photographed image. Accordingly, the other plurality of faces or people inside the photographed images leave the image, the specific subject is automatically tracked irrespective of an intention of a photographer so that the specific subject is maintained forcibly at the specific position of the photographed image.

SUMMARY OF THE INVENTION

The present invention provides a device capable of realizing subject tracking so that a plurality of subjects present in a photographed image are within a photographed image as much as possible.

According to an aspect of the present invention, a control device that performs tracking control on a subject by a movable unit shifting and moving the subject in a photographed image comprises a gravity center calculating unit configured to calculate one gravity center position corresponding to a plurality of subjects detected from the photographed image and a control unit configured to perform drive controlling on the movable unit so that the calculated gravity center position is located at a specific position of the photographed image.

Further features of the present invention will become apparent from the following description of exemplary embodiments with reference to the attached drawings.

BRIEF DESCRIPTION OF THE DRAWINGS

FIGS. 5A and 5B are diagrams for describing an example in which the imaging apparatus performs tracking control on one main subject.

FIGS. 8A to 8C are diagrams for describing tracking control performed by an imaging apparatus according to a second embodiment.

DESCRIPTION OF THE EMBODIMENTS

First Embodiment

Figure 1:
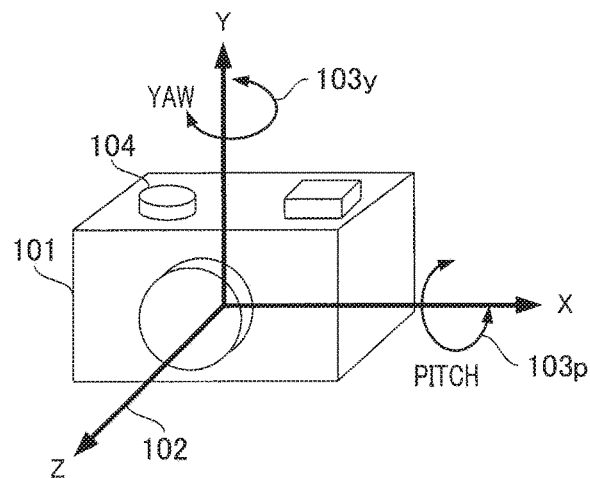
FIG. 1 is a diagram schematically illustrating an imaging apparatus according to an embodiment.
Figure 2:
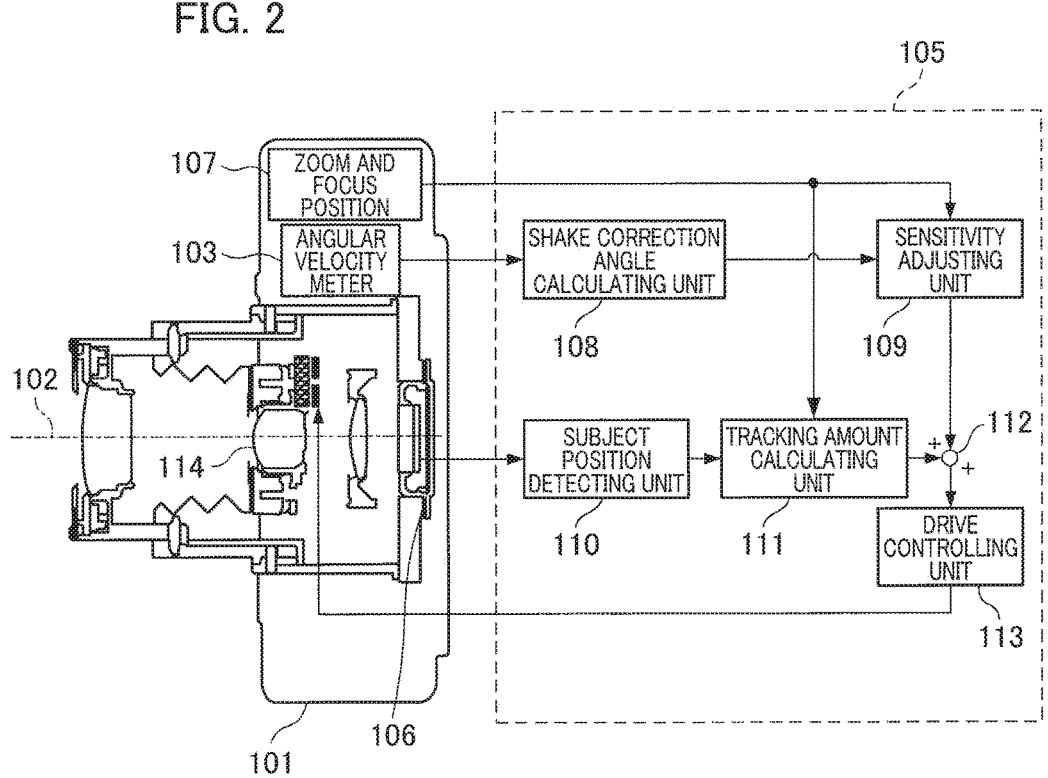
FIG. 2 is a diagram illustrating the configuration of the imaging apparatus.

FIG. 1 is a diagram schematically illustrating an imaging apparatus according to an embodiment. FIG. 2 is a diagram illustrating the configuration of the imaging apparatus.

A release button 104 is provided on the body of a camera 101. An opening or closing signal of a switch generated by a manipulation of the release button 104 is transmitted to a CPU 105. The CPU 105 functions as a control device according to the embodiment. The present invention can be applied to any optical device including the CPU 105. A correcting lens 114 and an image sensor 106 are located on an optical axis 102 of an imaging optical system. An angular velocity meter 103 is an angular velocity unit that detects an angular shake in a rotation indicated by an arrow 103$p$ (pitch) and an arrow 103$y$ (yaw). An output of the angular velocity meter 103 is input to the CPU 105. A shake correction angle calculating unit 108 calculates a shake correction angle based on the output of the angular velocity meter 103. Specifically, the shake correction angle calculating unit 108 cuts a DC component added as detection noise to the angular velocity meter 103 from the output of the angular velocity meter 103, subsequently performs an integration process, and outputs an angle signal. In the cutting of the DC component, for example, a highpass filter (HPF) or a highpass transmission filter is used. The output of the shake correction angle calculating unit 108 is input to a sensitivity adjusting unit 109.

The sensitivity adjusting unit 109 amplifies the output of the shake correction angle calculating unit 108 based on zoom and focus position information 107 and a focal distance or a photographing magnification obtained from the zoom and focus position information 107 and sets the amplified output as a shake correction target value. The reason for obtaining the shake correction target value based on the zoom and focus position information 107 is that shake correction sensitivity on a camera image surface with respect to shake correction stroke of the correcting lens 114 is changed by a change in optical information such as focus or zoom of a lens. The sensitivity adjusting unit 109 outputs the shake correction target value as a shake correction amount to a drive controlling unit 113.

The correcting lens 114 functions as a movable unit that shifts and moves a subject in a photographed image. The drive controlling unit 113 performs drive controlling on the correcting lens 114 and performs subject tracking control. The drive controlling unit 113 performs image blur correcting (optical anti-vibration) by driving the correcting lens 114 in a different direction from the optical axis. In the example illustrated in FIG. 2, the optical anti-vibration performed using the correcting lens 114 is adopted. However, as a method of correcting image blur, a method of correcting image blur by moving the image sensor into a plane perpendicular to the optical axis may be adopted. Electronic anti-vibration in which an influence of shake is reduced by changing a starting position of each photographing frame output by the image sensor may be applied. A plurality of image blur correcting methods may be combined.

Next, a method of controlling tracking of a subject using the correcting lens 114 will be described. A subject position detecting unit 110 illustrated in FIG. 2 detects the position of a subject (subject position) in a photographed image. A tracking amount calculating unit 111 calculates a tracking correction amount which is a control amount used for the correcting lens 114 to track a subject based on information regarding the detected subject position. An adder 112 adds a shake correction amount output by the sensitivity adjusting unit 109 and the tracking correction amount output by the tracking amount calculating unit 111 and outputs an added amount to the drive controlling unit 113. The drive controlling unit 113 calculates a drive amount of the correcting lens 114 based on the output from the adder 112 and drives the correcting lens 114 based on the drive amount to track a subject and correct image blur.

Next, a method of detecting a subject position in the subject position detecting unit 110 will be described. The image sensor 106 obtains image information by converting light reflected from a subject into an electric signal. The image information is converted into a digital signal. The image information converted into the digital signal is transmitted to the subject position detecting unit 110.

Methods of automatically recognizing a main subject among subjects captured in a photographed image are as follows. A first method is a method of detecting a person. The subject position detecting unit 110 detects a face or a human body as a subject in the photographed image. In a face detecting process, a pattern determined as the face of a person is decided in advance, and thus a portion matching the pattern included in the image can be detected as the face of the person. Even when a human body is detected, the human body is also detected based on the degree of matching with the pre-decided pattern. The subject position detecting unit 110 calculates reliability indicating a probability that each of the detected subjects is a subject (face). For example, the reliability is calculated from the degree of matching with the size of a face region or a face pattern in the image. That is, the subject position detecting unit 110 functions as a reliability calculating unit that calculates the reliability of a subject based on the size of the subject in the photographed image or the degree of matching between the subject and a pattern of a subject stored in advance.

As another method of detecting the main subject, each region obtained by sectioning a distribution introduced from a histogram of hue, saturation, or the like in an image in which a subject captured in the photographed image is imaged and classifying the captured image for each section may be recognized as a subject. For example, a subject is recognized by sectioning a histogram of a plurality of color components generated in regard to a captured image in a mountain-type distribution range and classifying the captured images in the regions belonging to combination of the same sections. By calculating an evaluation value for each of the recognized subjects, it is possible to determine a subject with the highest evaluation value as the main subject. After the main subject is decided, the region of the main subject can be tracked by detecting a similar region to a feature amount from sequentially subsequent captured images, for example, using the feature amount such as a hue distribution or a size. The position information of the detected subject is input to the tracking amount calculating unit 111. The tracking amount calculating unit 111 calculates the tracking correction amount. When the number of subjects is 1, the tracking amount calculating unit 111 calculates the tracking correction amount so that the gravity center position of the subject is located in the vicinity of the center of the image. When the number of subject is plural, the tracking amount calculating unit 111 obtains one gravity center position corresponding to the plurality of subjects and calculates the tracking correction amount so that the obtained gravity center position is located in the vicinity of the center of the image.

Figure 3A:
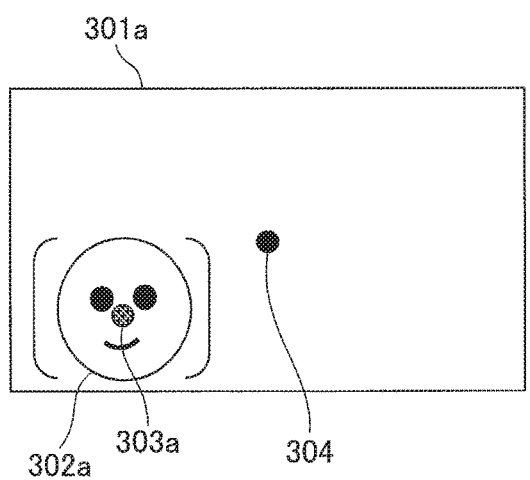
FIGS. 3A and 3B are diagrams for describing tracking control on a detected subject.
Figure 3B:
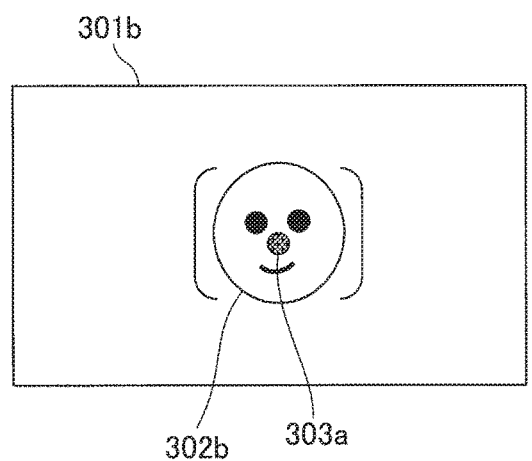

FIGS. 3A and 3B are diagrams for describing tracking control on a detected subject.

FIG. 3A illustrates a photographed image 301a before start of the subject tracking control. FIG. 3B illustrates a photographed image 301b after the start of the subject tracking control. In the photographed image 301a in FIG. 3A, a subject 302a is located at a position distant from an image center 304. Reference numeral 303a denotes the gravity center position of a subject 302a (subject gravity center position). The CPU 105 performs tracking control so that a distance to the image center 304 of the subject gravity center position 303a gradually becomes close by the tracking control and the image center 304 finally substantially matches the subject gravity center position. As illustrated in FIG. 3B, the subject gravity center position 303a of the subject 302b in which the tracking is successful matches the image center 304.

Figure 4:
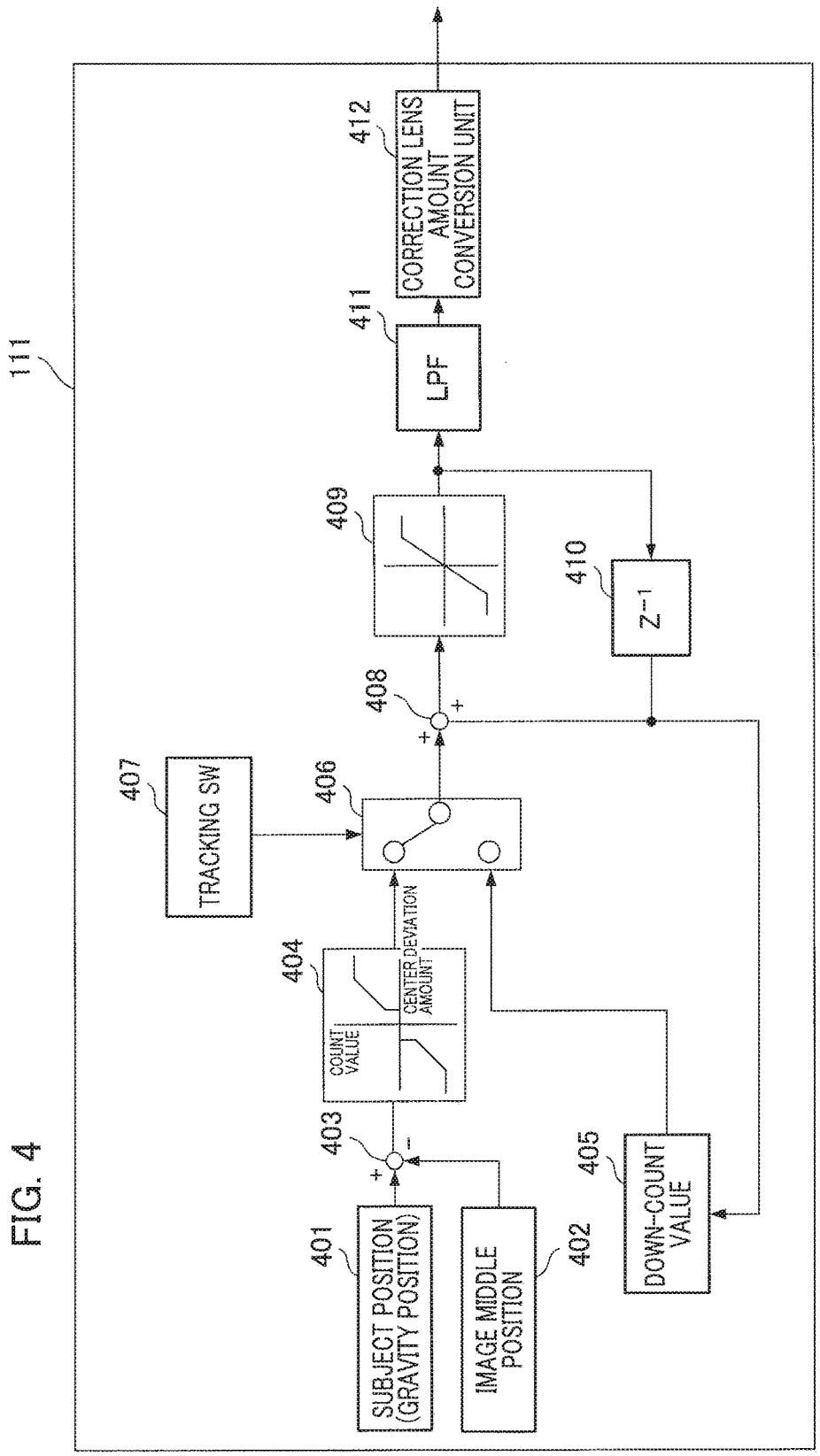
FIG. 4 is a block diagram illustrating an example of a function of a tracking amount calculating unit.

FIG. 4 is a block diagram illustrating an example of a function of a tracking amount calculating unit.

The tracking amount calculating unit 111 calculates an individual tracking correction amount at each axis in the vertical direction and the horizontal direction of the image. Here, only a single axis will be described.

A subtracter 403 subtracts the coordinates of a subject position 401 and the coordinates of an image middle position 402 based on subject position information output by the subject position detecting unit 110. Accordingly, a distance (center deviation amount) between an image center position and the gravity center position of a subject on an image is calculated and the calculated center deviation amount serves as signed data in which the image center is set to 0. An output of the subtracter 403 is input to a count value table 404 and a count value for tracking is calculated based on the magnitude of a distance of a difference between the subject gravity center position and the image center. The count value is calculated for each control sampling. Here, when the center deviation amount is equal to or less than a predetermined threshold value A or equal to or greater than a predetermined threshold value −A, the count value is set to 0, so that a dead-band region in which no tracking is performed within a predetermined range from the center is provided. In the count value table 404, the larger the center deviation amount is, the larger the count value. The sign of the count value is calculated in accordance with the sign of the center deviation amount.

The output of the count value table 404 is input to a signal selecting unit 406. An output of a down-count value outputting unit 405 and a state of a tracking switch 407 are also input to the signal selecting unit 406. When the tracking switch is turned on, the signal selecting unit 406 selects the output of the count value table 404 and outputs the selected output to an adder 408. When the tracking switch is turned off, the signal selecting unit 406 selects the output of the down-count value outputting unit 405 and outputs the selected output to the adder 408.

The down-count value outputting unit 405 outputs a down-count value. A previous sampled value 410 of the tracking amount calculated in post-processing is also input to the down-count value outputting unit 405. The previous sampled value 410 of the tracking amount is a tracking correction amount up to the previous sampling. When the sign of the previous sampled value 410 of the tracking amount is positive, the down-count value outputting unit 405 sets the down-count value to a negative. When the sign of the previous sampled value 410 of the tracking amount is negative, the down-count value outputting unit 405 sets the down-count value to a positive so that the absolute value of the tracking correction amount decreases. When the previous sampled value 410 of the tracking amount is within 0± a predetermined range, the down-count value outputting unit 405 sets the down-count value to 0.

The adder 408 adds an output of the signal selecting unit 406 and the previous sampled value 410 of the tracking amount. An output of the adder 408 is input to an upper and lower limit setting unit 409. The upper and lower limit setting unit 409 sets the tracking correction amount so that the tracking correction amount is not equal to or greater than a predetermined upper limit and is not equal to or less than a predetermined lower limit. An output of the upper and lower limit setting unit 409 is input to a lowpass filter (LPF or a lowpass transmission filter) 411. High-frequency noise of subject detection in the output of the upper and lower limit setting unit 409 is cut by the LPF 411 and the output is output to a correction lens amount conversion unit 412. The correction lens amount conversion unit 412 converts an output of the LPF 411 into a signal used for the correcting lens 114 to track a subject. Accordingly, a final tracking correction amount is calculated. By driving the correcting lens 114 based on the tracking correction amount obtained through the above-described processes, the tracking correction is performed in such a manner that the gravity center position of the subject is gradually located in the vicinity of the image center.

FIGS. 5A and 5B are diagrams for describing an example in which the imaging apparatus performs tracking control on one main subject.

In a photographed image, a plurality of subjects is present. In the example illustrated in FIGS. 5A and 5B, the imaging apparatus performs tracking control such that the gravity center position of a main subject (face) detected form the photographed image transitions to the center position of the photographed image. FIG. 5A illustrates an image before start of the tracking control. FIG. 5B illustrates an image when the subject is captured in the vicinity of the image center after the start of the tracking control.

In a photographed image 501a, a main subject 502a is located at a point distant from the image center. The CPU 105 performs the tracking control such that the distance from the subject gravity center position 503a to the image center gradually becomes close and the image center substantially matches the subject gravity center position finally. In an image 501b in which the tracking is successful, a subject gravity center position 503a matches the image center. However, when a plurality of faces are present in the photographed image 501a before start of the tracking control and the tracking control is performed on reference numeral 502a recognized as the main subject at the image center, the positions of other subjects 504a are neglected. Accordingly, in the photographed image 502b when the main subject is captured at the center, the other subjects 504b may leave the photographed image.

However, it may not be true that a photographer wants the face of the subject 502a tracked to the center. Since there is a possibility of the photographer wanting to photograph another face as a main subject, an image not intended by the photographer can be obtained in some cases in the tracking control described with reference to FIGS. 5A and 5B. Even when the photographer shakes the camera to frame a subject desired to be photographed and gets the subject back in the image, the imaging apparatus maintains the subject 502a recognized in the tracking control at the image center, and thus the framing operation may be affected.

Accordingly, when a plurality of subjects are present in a photographed image, the imaging apparatus according to the first embodiment calculates one gravity center position corresponding to the plurality of subjects as a tracking target position based on the gravity center position and the reliability of each subject. The drive controlling unit 113 (see FIG. 2) included in the imaging apparatus performs tracking control such that the calculated tracking target position is located at a specific position (in this example, the vicinity of an image center). Accordingly, when a plurality of subjects (faces or people) is present in a photographed image, a specific subject may not be mistaken and a subject originally photographed by the photographer may not leave from a screen.

Figure 6A:
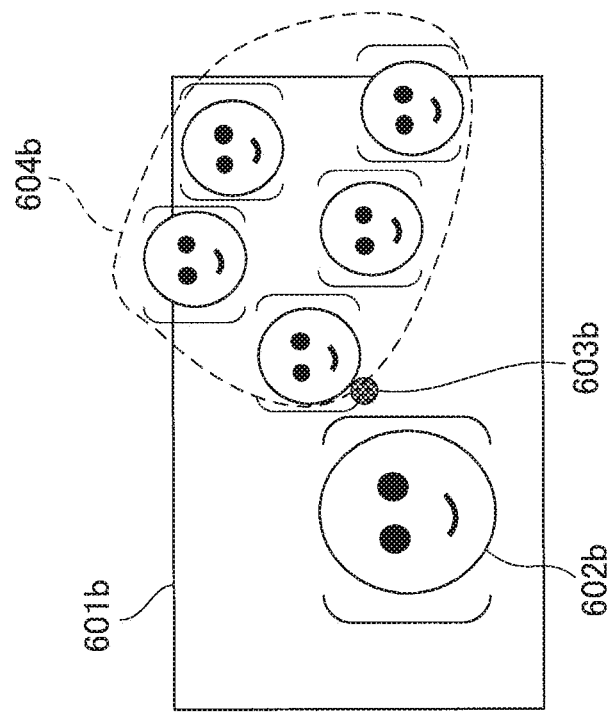
FIGS. 6A and 6B are diagrams for describing tracking control performed by an imaging apparatus according to a first embodiment.
Figure 6B:
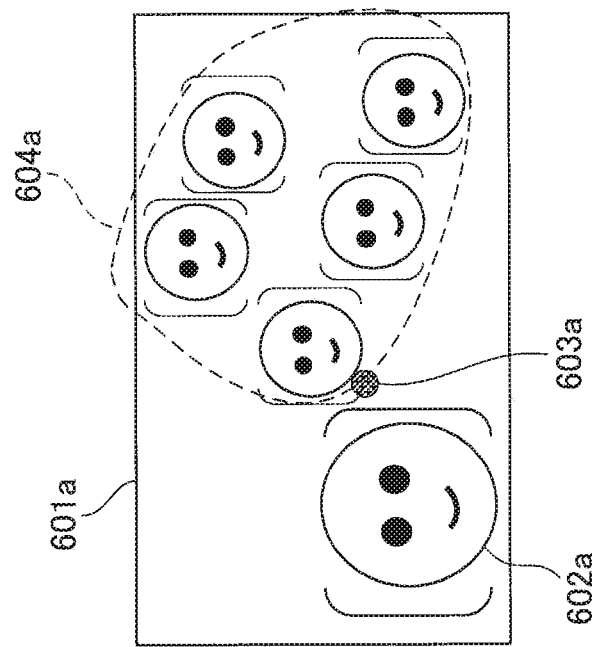

FIGS. 6A and 6B are diagrams for describing tracking control performed by an imaging apparatus according to a first embodiment.

FIG. 6A illustrates an image before start of the tracking control. FIG. 6B illustrates an image after the start of the tracking control.

In a photographed image 601a, a plurality of subjects (subjects 602a and 604a) are present. The tracking amount calculating unit 111 (see FIG. 2) included in the imaging apparatus functions as a gravity center calculating unit that calculates one gravity center position corresponding to the plurality of subjects by Expression 1 based on the number n of detected faces, a gravity center coordinate position b of each face, and reliability a of each face.

[Math. 1]

$$y = \sum_{i=1}^{n} \left( b_i \times \frac{a_i}{\sum_{i=1}^{n} a_i} \right) \quad (1)$$

Here, n is the number of detected faces, b is the gravity center coordinate position of each face, a is reliability of each face, and y is one gravity center position corresponding to a plurality of subjects. In the embodiment, the tracking amount calculating unit 111 increases the weight of a face with high reliability so that a calculated gravity center position is located in the vicinity of the face with the high reliability.

In the photographed image 601a in FIG. 6A, reference numeral 603a denotes a gravity center position corresponding to the plurality of subjects.

As shown in a photographed image 602b in FIG. 6B, the imaging apparatus performs the tracking control such that the gravity center position y transitions to an image center position. In this example, the reliability of a subject 602a is higher than that of the subjects 604a from the viewpoint of the sizes of the faces. Accordingly, the gravity center position y is not simply calculated to the center position of the face position present in the image, but the calculated gravity center position y is the position to the subject 602b by Expression (1). However, subjects 604b can be prevented from coming off the photographed image as much as possible.

Figure 7:
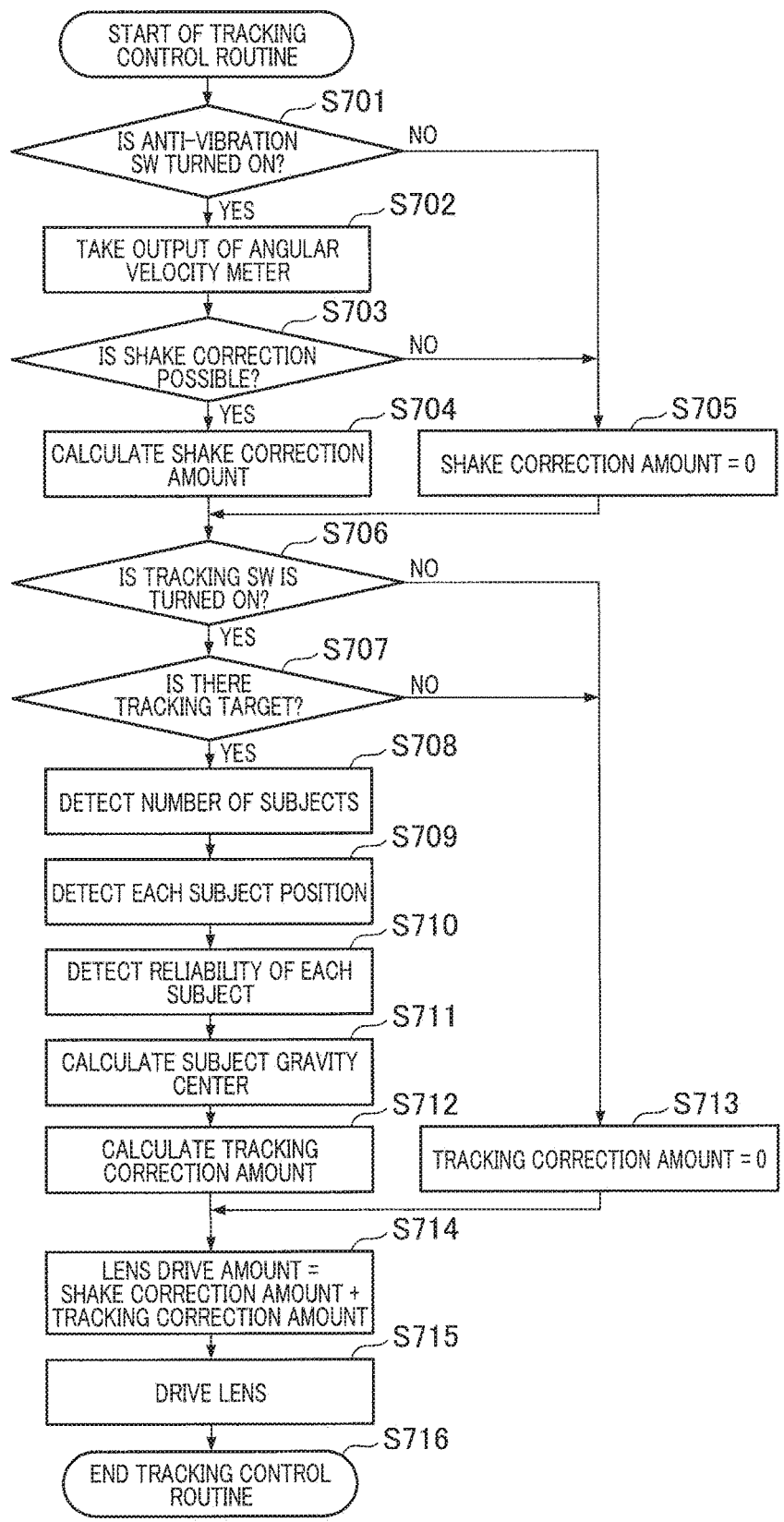
FIG. 7 is a flowchart for describing an example of tracking control on a subject.

FIG. 7 is a flowchart for describing an example of tracking control on a subject.

The tracking control illustrated in FIG. 7 is performed at a constant sampling period when a main power supply of the camera 101 is turned on and starts.

First, in step S701, the CPU 105 determines whether an anti-vibration SW is turned on. When the anti-vibration SW is turned off, the process proceeds to S705 and the CPU 105 sets the shake correction amount to 0. Then, the process proceeds to step S706. When the anti-vibration SW is turned on, the process proceeds to S702.

In step S702, the CPU 105 takes an output of the angular velocity meter 103. In step S703, the CPU 105 determines whether the camera is a state in which the shake correction is possible. Specifically, when the camera is in a state from supply of power to stabilization of the output of the angular velocity meter 103, the CPU 105 determines that the shake correction is not possible. When the camera is in a state after the stabilization of the output of the angular velocity meter 103, the CPU 105 determines that the shake correction is possible. Accordingly, it is possible that the shake correction is not performed in a state in which an output value immediately after the supply of power is unstable. When the camera is not in the state in which the shake correction is possible, the process proceeds to step S705. When the camera is in the state in which the shake correction is possible, the process proceeds step S704.

In step S704, the CPU 105 causes the shake correction angle calculating unit 108 and the sensitivity adjusting unit 109 to calculate the shake correction amount based on the output of the angular velocity meter captured in step S702. Subsequently, in step S706, the CPU 105 determines whether the tracking SW is turned on. When the tracking SW is turned off, the process proceeds to step S713. Then, in step S713, the CPU 105 sets the tracking correction amount to 0 and the process proceeds to step S714. When the tracking SW is turned on, the process proceeds to step S707.

In step S707, the CPU 105 determines whether there is a tracking target subject from an image signal captured by the image sensor 106. When there is no tracking target subject, the process proceeds to step S713. When there is the tracking target subject, the process proceeds to step S708.

In step S707, the CPU 105 detects the number of subjects. Subsequently, in step S709, the CPU 105 detects the gravity center position of each subject. In step S710, the CPU 105 detects the reliability of each subject.

Next, in step S711, the CPU 105 calculates the subject gravity center position using Expression (1) based on the number of subjects detected in steps S708 to S710, the gravity center position of each subject, and the reliability of each subject. Subsequently, in step S712, the CPU 105 causes the tracking amount calculating unit 111 to calculate the tracking correction amount based on the subject gravity center position Next, in step S714, the CPU 105 adds the shake correction amount calculated in step S704 and the tracking correction amount calculated in step S712 to calculate a lens drive amount. Subsequently, in step S715, the CPU 105 causes the drive controlling unit 113 to drive the correcting lens 114 based on the lens drive amount. Accordingly, the image blur is corrected and the subject is tracked. Then, the process proceeds to step S716 to end the shake correction routine and a standby state is entered until a subsequent sampling period.

The control device according to the first embodiment calculates one gravity center position corresponding to the plurality of subjects from the positions of the plurality of subjects in the photographed image and the reliability of each subject and performs the automatic tracking control based on the gravity center position. Accordingly, it is possible to prevent the other subjects from leaving the screen by the tracking of only the specific subject and prevent an automatic tracking operation not intended by the photographer from being performed.

In the embodiment, so-called optical anti-vibration for movement into a plane perpendicular to the optical axis by using the correcting lens as a shake correcting unit is applied. However, the present invention is not limited to the optical anti-vibration, but the following configurations can also be applied:

(1) the configuration of a subject tracking device that moves an image sensor into a plane perpendicular to an optical axis;

(2) the configuration of a subject tracking device that changes a start position of each photographing frame output by an image sensor;

(3) the configuration of a subject tracking device that rotatably drives a barrel including an image sensor and a photographing lens group;

(4) the configuration of a subject tracking device in which a rotary camera platform that is provided separately from the imaging apparatus and can pan and tilt an imaging apparatus is combined; and (5) combinations of the configurations of the plurality of above subject tracking devices.

Second Embodiment

FIGS. 8A to 8C are diagrams for describing tracking control performed by an imaging apparatus according to a second embodiment.

As in the first embodiment, the imaging apparatus calculates one gravity center position corresponding to a plurality of subjects by Expression (1) based on the number n of detected faces, the gravity center coordinate position b of each face, and the reliability a of each face. Then, the imaging apparatus performs tracking control so that the gravity center position is maintained at an image center. In the second embodiment, the CPU 105 detects a camera shaking operation (subject tracking manipulation) of a photographer based on an output of the angular velocity meter 103, that is, a shake detection signal indicating shake applied to that imaging apparatus. The CPU 105 estimates a subject aimed at by the photographer based on the detected camera shake operation and sets reliability of the subject to be high to re-calculate the gravity center position. Then, the tracking control is performed such that the re-calculated gravity center position is maintained at the image center.

In a photographed image 801a in FIG. 8A, the tracking control is performed such that a gravity center position 804a corresponding to two subjects (802a and 803a) is maintained at the image center. In this state, when the photographer operates the camera so that the subject 803a returns to the image center, camera shake in a direction indicated by an arrow 805a occurs. The imaging apparatus detects the camera shake and estimates that the subject aimed at by the photographer is the subject 803a based on the detection result. Then, the imaging apparatus sets the reliability of the subject 803a to be high to re-calculate the gravity center position. That is, the imaging apparatus sets the reliability of the subject 803a located in the direction of the camera shake to be higher and sets the reliability of the subject 802a in the opposite direction to the direction of the camera shake or in the vicinity of the center to be lower again to re-calculate the gravity center position. The imaging apparatus performs the tracking control so that the re-calculated gravity center position is maintained at the image center.

In a photographed image 801b in FIG. 8B, the tracking control is performed such that a re-calculated gravity center position 804b is maintained at the image center. In this state, when the photographer operates the camera so that a subject 803b returns further to the image center, camera shake in the direction indicated by the arrow 805a occurs. The imaging apparatus sets the reliability of the subject 803b located in the camera shake direction to be higher and sets the reliability of the subject 802b to be lower again. The gravity center position is re-calculated based on the reliability set newly again and the tracking control is performed such that this gravity center position is maintained at the image center. In a photographed image 801c in FIG. 8C, the tracking control is performed such that a re-calculated gravity center position 804c is maintained at the image center. According to the imaging apparatus according to the second embodiment, it is possible to prevent the automatic tracking control not intended by the photographer.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-086886, filed Apr. 21, 2015, which is hereby incorporated by reference wherein in its entirety.

What is claimed is:

1. A control device that performs tracking control on a subject by a movable unit shifting and moving the subject in a photographed image, the device comprising:
    a gravity center calculating unit configured to calculate one gravity center position corresponding to a plurality of subjects detected from the photographed image; and
    a control unit configured to perform drive controlling on the movable unit so that the calculated gravity center position is located at a specific position of the photographed image.

2. The control device according to claim 1,
    wherein the gravity center calculating unit calculates the one gravity center position corresponding to the plurality of subjects based on the number of detected subjects, the gravity center position of each subject, and reliability indicating a probability that each subject is a subject.

3. The control device according to claim 2,
    wherein the gravity center calculating unit increases a weight of the subject with the high reliability so that the calculated gravity center position is located in vicinity of the subject with the high reliability.

4. The control device according to claim 2, further comprising:
    a detecting unit configured to detect a subject tracking manipulation of a photographer based on a shake detection signal indicating a shake applied to the control device; and
    a changing unit configured to change the reliability of the subject according to the detected subject tracking manipulation.

5. The control device according to claim 4,
    wherein the changing unit raises the reliability of the subject present in a direction of the shake when the subject tracking manipulation is detected.

6. The control device according to claim 5,
    wherein the changing unit lowers the reliability of the subject present in vicinity of a center of the photographed image or the subject present in an opposite direction to the direction of the shake when the subject tracking manipulation is detected.

7. The control device according to claim 1, wherein the subject is a face or a human body of a person.

8. The control device according to claim 1, further comprising:
a reliability calculating unit configured to calculate reliability of the subject based on a size of the subject in the photographed image or a degree of matching between the subject and a pre-stored pattern of a subject.

9. An optical apparatus that includes a control device performing tracking control on a subject by a movable unit shifting and moving the subject in a photographed image, wherein the control device comprises:
a gravity center calculating unit configured to calculate one gravity center position corresponding to a plurality of subjects detected from the photographed image; and
a control unit configured to perform drive controlling on the movable unit so that the calculated gravity center position is located at a specific position of the photographed image.

10. An imaging apparatus that includes a control device performing tracking control on a subject by a movable unit shifting and moving the subject in a photographed image, wherein the control device comprises:
a gravity center calculating unit configured to calculate one gravity center position corresponding to a plurality of subjects detected from the photographed image; and
a control unit configured to perform drive controlling on the movable unit so that the calculated gravity center position is located at a specific position of the photographed image.

11. A control method for performing tracking control on a subject by a movable unit shifting and moving the subject in a photographed image, the method comprising:
calculating one gravity center position corresponding to a plurality of subjects detected from the photographed image; and
performing drive controlling on the movable unit so that the calculated gravity center position is located at a specific position of the photographed image.

* * * * *